United States Patent Office 3,072,708
Patented Jan. 8, 1963

3,072,708
VITAMIN A AMINOBENZOATES
Balthasar Hegedüs, Binningen, Otto Isler, Basel, Rudolf Rüegg, Bottmingen, and Gottlieb Ryser, Basel, Switzerland, assignors to Hoffmann-La Roche Inc., Nutley, N.J., a corporation of New Jersey
No Drawing. Filed July 20, 1960, Ser. No. 44,003
Claims priority, application Switzerland July 24, 1959
8 Claims. (Cl. 260—471)

It is known that vitamin A is especially sensitive to oxygen. It decomposes in the presence of air merely upon exposure for several hours. The presently known esters of vitamin A show similar high instability. By the addition of antioxidants, for example α-tocopherol, to vitamin A compositions it is possible to improve the stability of vitamin A, although this approach for many purposes is still not satisfactory.

It has now been surprisingly found that certain substituted benzoic acid esters of vitamin A, by themselves and without the addition of antioxidants, have remarkably high stability. Accordingly it is an object of this invention to provide stabilized forms of vitamin A.

The stable esters of this invention are mono- and di-aminobenzoates of vitamin A and N-alkyl and N-acyl products thereof, i.e. benzoic acid esters of vitamin A wherein the benzoyl radical bears one or two

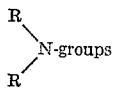

The symbols R represent hydrogen, alkyl or acyl. These substituted benzoic acid esters may be represented by the structural formula

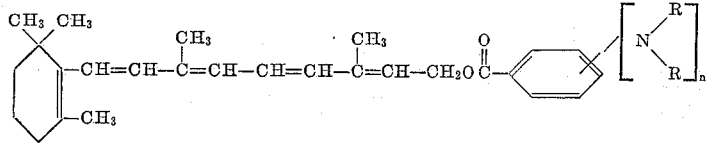

wherein the symbols R represent the groups already described and $n$ represents the integers 1 or 2.

Preferably there is only one acylamino group which contains but one acyl radical on the nitrogen. Substituents represented by the symbol R include lower alkyl groups such as methyl, ethyl and the like, acyl groups derived from lower alkanoic acids, such as acetyl, propionyl and the like or aromatic carboxylic acid radicals, such as benzoyl and the like. Especially preferred compounds within this group of stable vitamin A esters are vitamin A p-aminobenzoate, vitamin A m-aminobenzoate, vitamin A o-aminobenzoate and vitamin A 3,5-diaminobenzoate.

These esters may be obtained by the esterification of vitamin A with a benzoic acid appropriately substituted with nitro, amino, alkylamino, dialkylamino or acylamino groups, or a reactive derivative thereof. Especially useful reactive acid derivatives include the acid halides, especially the acid chloride, and the acid anhydrides. Esterification of vitamin A with a mono- or di-nitrobenzoic acid or derivative results in the corresponding vitamin A mono- or di-nitrobenzoate, which are reduced in a second reaction step to vitamin A mono- or di-aminobenzoates. The reduction of the nitro group may be effected in the presence of a catalyst, for example Raney nickel, in a solvent such as alcohol or toluene-alcohol mixtures.

The vitamin A esters described above may also be obtained by trans-esterification. For example, a lower carboxylic acid ester of vitamin A, e.g. vitamin A acetate, can be heated with an ester formed from a lower aliphatic alcohol and an amino-, alkylamino-, dialkylamino-, acyl-amino- or nitro-substituted benzoic acid, preferably p-nitrobenzoic acid, m-nitrobenzoic acid, 3,5-dinitrobenzoic acid, p-aminobenzoic acid, m-aminobenzoic acid, o-aminobenzoic acid and 3,5-diaminobenzoic acid. The trans-esterification reaction is preferably effected in the presence of a trans-esterification catalyst, for example alkali metal hydroxides or alkali metal alcoholates, with the continuous removal of the lower aliphatic alcoholic esters of the lower carboxylic acids formed as by-product. If an ester of nitrobenzoic acid is used for the trans-esterification, the nitro group is then reduced to the amino group.

The substituted benzoic acid esters of vitamin A of this invention are stable vitamin-active substances which may be used in the same manner as known vitamin A esters such as the acetate.

The following examples illustrate how the substituted benzoic acid esters may be produced. All temperatures are expressed on the centigrade scale.

Example 1

8 g. of p-nitrobenzoyl chloride were dissolved in 70 ml. of absolute pyridine. The resulting solution was cooled to +10°. 10 g. of vitamin A alcohol were then added, the air was replaced with an atmosphere of nitrogen and the mixture was allowed to stand for 6 hours at room temperature. Then ice and water were added. The mixture was extracted with ether and the ether extract was washed successively with water, dilute sulfuric acid, water, sodium bicarbonate solution and again with water. After drying over sodium sulfate and evaporation of the ether, the yellow-orange oil obtained was dissolved in 100 ml. of low-boiling petroleum ether. Upon standing in the refrigerator at 0°, vitamin A p-nitrobenzoate crystallized in the form of light yellow crystals, M.P. 65°, absorption maximum at 326 mμ, $E_1^1$=1240 (in petroleum-ether).

13.5 g. of vitamin A p-nitrobenzoate were dissolved in 1000 ml. of alcohol with the addition of 200 ml. of toluene. The solution was then agitated in a hydrogen atmosphere in the presence of Raney nickel until the theoretical proportion of hydrogen for the reduction of the nitro group (2.3 liters) was absorbed. The mixture was filtered and the solvent was evaporated from the filtrate under water vacuum. The residue was dissolved in 100 ml. of high-boiling petroleum ether while hot, the solution was treated with a small amount of activated charcoal and then filtered. Upon cooling the filtrate, vitamin A p-aminobenzoate crystallized in the form of yellow-orange crystals, M.P. 98–100°, absorption maximum at 326 mμ, $E_1^1$=1450 (in alcohol).

Example 2

8 g. of m-nitrobenzoyl chloride were dissolved in 70 ml. of pyridine. The solution was cooled to +10°. 10 g. of vitamin A alcohol were added and the reaction mixture was permitted to stand at room temperature for 5 hours. The solution was poured into ice water and extracted with 250 ml. of ether. The ether solution was then washed twice with 200 ml. portions of water, once with 200 ml. of 3% sulfuric acid, again with water, then with 200 ml. of 1% sodium bicarbonate solution and finally once more with water. After drying the ether solution over sodium sulfate and then evaporating the ether, a yellow viscous oil was obtained which was dissolved in 100 ml. of petroleum ether (boiling range 60–90°). A small amount of undissolved material was filtered off and vitamin A m-nitrobenzoate crystallized upon standing at 0° in the form of orange-red prisms, M.P. 78°, absorption maximum at 326 m$\mu$, $E_1^1=1130$ (in alcohol).

12 g. of vitamin A m-nitrobenzoate were dissolved in 150 ml. of toluene and 100 ml. of alcohol, then agitated in a hydrogen atmosphere in the presence of Raney nickel until 2.1 liters of hydrogen were absorbed. The reaction mixture was filtered and the solvent was evaporated from the filtrate. The residue was dissolved in the smallest possible amount of benzene and brought to crystallization by addition of petroleum ether. Vitamin A m-aminobenzoate was obtained in the form of yellow prisms, M.P. 108°, absorption maximum at 326 m$\mu$, $E_1^1=1300$ (in alcohol).

*Example 3*

10 g. of vitamin A alcohol, 5 g. of anthranilic acid methylester and a solution of 80 mg. of sodium hydroxide in 0.5 ml. of methanol were heated under high vacuum for 4 hours at 55° while hydrogen was introduced through a fine capillary tube. The cooled reaction mixture was dissolved in ether and the ether solution was washed with water. After drying the ether solution with sodium sulfate and evaporating the solvent, a yellow oil was obtained which was dissolved and crystallized in petroleum ether at 0°. Upon crystallization, vitamin A o-aminobenzoate was obtained in the form of dense yellow prisms, M.P. 93–95°, absorption maximum at 327 m$\mu$, $E_1^1=1245$ (in alcohol).

*Example 4*

10 g. of vitamin A alcohol were added at a temperature of +10° to a mixture of 8.4 g. of 3,5-dinitrobenzoyl chloride in 120 ml. of pyridine. The reaction mixture was then allowed to stand at room temperature for one hour and worked up according to the procedure described in Example 1. Vitamin A 3,5-dinitrobenzoate was obtained in the form of a crystalline residue. This was recrystallized from petroleum ether (boiling range 90–110°), whereupon red prisms were obtained which slowly decomposed above 150°, absorption maximum at 328 m$\mu$, $E_1^1=1020$ (in alcohol).

5.5 g. of vitamin A 3,5-dinitrobenzoate were dissolved in 200 ml. of toluene and 50 ml. of alcohol, then agitated in a hydrogen atmosphere in the presence of Raney nickel at room temperature until 1.7 liters of hydrogen were absorbed. After filtering the hydrogen solution, and evaporating the solvent in vacuo from the filtrate, the residue was crystallized by dissolving in acetone and adding petroleum ether (boiling range 60–90°). Vitamin A 3,5-diaminobenzoate was obtained in the form of solid colorless leaflets, M.P. 124°, absorption maximum at 327 m$\mu$, $E_1^1=1310$ (in alcohol).

*Example 5*

10. g. of vitamin A alcohol, 60 ml. of pyridine and 7.05 g. of p-dimethylaminobenzoyl chloride were mixed together and allowed to stand for 6 hours at room temperature. The ice and water were added. The mixture was extracted with ether and the ether extract was washed successively with water, dilute sulfuric acid, 5% sodium bicarbonate solution and again with water. The product obtained after evaporating off the ether was recrystallized from acetone. There was obtained vitamin A p-dimethylaminobenzoate as almost colorless prisms, M.P. 76–77°, absorption maximum at 326 m$\mu$, $E_1^1=1725$ (in alcohol).

*Example 6*

30 g. of vitamin A p-aminobenzoate and 130 ml. of acetic acid anhydride were mixed together and stirred for 15 minutes under nitrogen at 35°. The acetylation product began to precipitate after a few minutes. The precipitate was filtered off and recrystallized from a mixture of solvents consisting of 90% by volume of petroleum ether (boiling range 80–105°) and 10% by volume of benzene. The thus obtained vitamin A p-acetaminobenzoate melted at 118–119°, absorption maximum at 327 m$\mu$, $E_1^1=1190$ (in petroleum ether).

*Example 7*

50 g. of vitamin A acetate and 40 g. of p-aminobenzoic acid ethyl ester were placed in a flask fitted with a stirrer, a distillation trap with descending cooler, an inlet for toluene, a dropping funnel and a thermometer, and dissolved in 750 ml. of toluene. The dropping funnel was filled with a solution of 20 ml. of sodium ethylate (prepared by dissolving 1 g. of sodium in 20 ml. of ethanol) and 100 ml. of toluene. Then, the flask was heated on a water bath and the vacuum fixed at the distillation trap in such a rate that toluene went off at a temperature of 23–26°. The solution from the dropping funnel was added within one hour, and at the same time the 2.5 liters of toluene that distilled off during that time were replaced. In order to remove the p-aminobenzoic acid ethyl ester that formed, the reaction mixture was treated only 3 times with 500 ml. of 1% hydrochloric acid under nitrogen. The toluene solution was then washed with 500 ml. of a 5% sodium bicarbonate solution and 500 ml. of water. The residue obtained after distilling off the toluene was recrystallized from toluene. There was thus obtained 45 g. of vitamin A p-aminobenzoate, M.P. 101–104°.

Having now particularly described and ascertained the nature of our said invention and in what manner the same is to be performed, we declare that what we claim is:

1. A vitamin A ester of the formula:

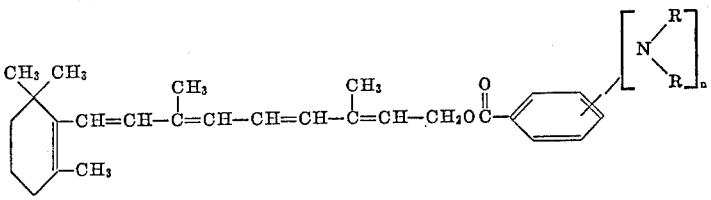

wherein R is a member of the group consisting of hydrogen, lower alkyl, lower alkanoyl and benzoyl, and $n$ is an integer from 1 to 2.

2. A vitamin A ester of the formula

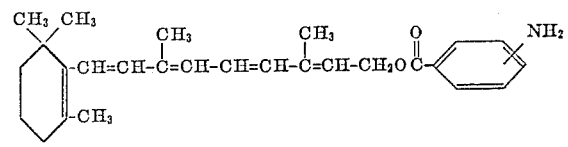

3. Vitamin A p-aminobenzoate.
4. Vitamin A m-aminobenzoate.
5. Vitamin A o-aminobenzoate.
6. Vitamin A 3,5-diaminobenzoate.
7. Vitamin A p-dimethylaminobenzoate.
8. Vitamin A p-acetaminobenzoate.

References Cited in the file of this patent

UNITED STATES PATENTS

| | | |
|---|---|---|
| 2,169,195 | Hickman et al. | Aug. 8, 1939 |
| 2,434,687 | Embree et al. | Jan. 20, 1948 |
| 2,443,473 | Milas | June 15, 1948 |
| 2,822,380 | Clinton | Feb. 4, 1958 |